US007625437B2

(12) United States Patent
Heer (10) Patent No.: US 7,625,437 B2
(45) Date of Patent: Dec. 1, 2009

(54) CARTRIDGE FOR CLEANING COMPRESSED AIR IN COMPRESSED AIR SUPPLY SYSTEMS OF MOTOR VEHICLES

(75) Inventor: Siegfried Heer, Wiesloch (DE)

(73) Assignee: Haldex Brake Products GmbH (DE)

( * ) Notice: Subject to any disclaimer, the term of this patent is extended or adjusted under 35 U.S.C. 154(b) by 437 days.

(21) Appl. No.: 11/298,183

(22) Filed: Dec. 9, 2005

(65) Prior Publication Data

US 2006/0123743 A1    Jun. 15, 2006

(30) Foreign Application Priority Data

Dec. 10, 2004  (DE)  .................. 10 2004 059 508

(51) Int. Cl.
 *B01D 53/02* (2006.01)
(52) U.S. Cl. .............. 96/134; 55/309; 55/312; 55/313; 55/314; 55/DIG. 17; 96/147
(58) Field of Classification Search .......... 55/385.1, 55/DIG. 17, 312–314, 417, 420, 309; 96/130, 96/141–144, 114, 146, 408, 147, 108, 134, 96/135, 137, 116; 34/79, 80, 82; 137/341; 95/90, 117–126, 143, 148
See application file for complete search history.

(56) References Cited

U.S. PATENT DOCUMENTS

| 4,544,385 | A | * | 10/1985 | Tanaka | ............ | 96/114 |
| 4,692,175 | A | * | 9/1987 | Frantz | ............ | 96/408 |
| 4,713,094 | A | * | 12/1987 | Yanagawa et al. | ............ | 96/147 |
| 5,002,593 | A |  | 3/1991 | Ichishita et al. | ............ | 55/218 |
| 5,286,283 | A | * | 2/1994 | Goodell | ............ | 96/113 |
| 5,334,230 | A | * | 8/1994 | Sloka | ............ | 96/113 |
| 5,607,500 | A | * | 3/1997 | Shamine et al. | ............ | 96/144 |
| 5,779,772 | A | * | 7/1998 | Unger et al. | ............ | 96/137 |
| 5,961,698 | A | * | 10/1999 | Dossaji et al. | ............ | 96/130 |
| 6,581,297 | B1 | * | 6/2003 | Ginder | ............ | 34/79 |
| 6,723,154 | B2 | * | 4/2004 | Olsson et al. | ............ | 95/118 |
| 6,786,953 | B2 | * | 9/2004 | Fornof et al. | ............ | 95/122 |

(Continued)

FOREIGN PATENT DOCUMENTS

DE            1555530            2/1972

(Continued)

OTHER PUBLICATIONS

European Search Report; Mar. 6, 2006; 3 pages.

*Primary Examiner*—Duane Smith
*Assistant Examiner*—Minh-Chau T Pham
(74) *Attorney, Agent, or Firm*—St. Onge Steward Johnston & Reens LLC (57) ABSTRACT

A cartridge of an air dryer serves for cleaning compressed air to be used in compressed air supply systems of motor vehicles, especially trucks. The cartridge includes a housing, a pre-filter, a deposit chamber, a coalescing filter, a bypass conduit and a check valve. The deposit chamber is located downstream of the pre-filter. The deposit chamber is filled with a treating substance. The coalescing filter is arranged between the pre-filter and the deposit chamber. The bypass conduit is designed and arranged to bypass the coalescing filter and not to bypass the pre-filter. The check valve is arranged in the bypass conduit in a way that it opens during regeneration of the cartridge.

20 Claims, 5 Drawing Sheets

U.S. PATENT DOCUMENTS

| | | | |
|---|---|---|---|
| 6,951,581 B2 * | 10/2005 | Fornof et al. | 95/122 |
| 7,097,696 B2 * | 8/2006 | Salzman et al. | 96/121 |
| 2002/0104440 A1 * | 8/2002 | Miller et al. | 96/421 |
| 2002/0194991 A1 * | 12/2002 | Olsson et al. | 95/118 |
| 2004/0016342 A1 | 1/2004 | Fornof et al. | 95/117 |
| 2004/0094036 A1 * | 5/2004 | Nichols et al. | 95/148 |
| 2005/0235617 A1 * | 10/2005 | Read | 55/423 |
| 2006/0123743 A1 * | 6/2006 | Heer | 55/309 |
| 2007/0144350 A1 * | 6/2007 | Paling | 96/134 |
| 2007/0180999 A1 * | 8/2007 | Paling et al. | 96/134 |
| 2008/0307965 A1 * | 12/2008 | Hoffman et al. | 95/119 |

FOREIGN PATENT DOCUMENTS

| | | |
|---|---|---|
| DE | 103 29 401 A1 | 1/2005 |
| EP | 0 036 569 | 9/1981 |
| WO | WO 94/26569 | 11/1994 |
| WO | WO 99/21641 | 5/1999 |
| WO | WO 01/26783 | 4/2001 |
| WO | WO 01/52973 | 7/2001 |

* cited by examiner

CARTRIDGE FOR CLEANING COMPRESSED AIR IN COMPRESSED AIR SUPPLY SYSTEMS OF MOTOR VEHICLES

CROSS-REFERENCE TO RELATED APPLICATIONS

This application claims priority to co-pending German Patent Application No. DE 10 2004 059 508.9 entitled "Verfahren zum Reinigen von Druckluft an Druckluftbeschaffungsanlagen von Kraftfahrzeugen sowie Kartusche hierfür", filed Dec. 10, 2004.

FIELD OF THE INVENTION

The present invention generally relates to a cartridge for cleaning compressed air in compressed air supply systems of motor vehicles. The present invention also relates to a method for cleaning compressed air being used in compressed air supply systems of motor vehicles.

BACKGROUND OF THE INVENTION

A method for cleaning compressed air in a compressed air supply system of a motor vehicle is known from the PCT Application published under WO 01/26783 A1 and corresponding to U.S. Pat. No. 6,723,154 B2. The compressed air coming from a compressor and especially including oil and water is cleaned by first passing it through a pre-filter, then through a layer of silica gel, then through a molecular sieve and finally through a fine filter. The pre-filter serves to collect larger solid particles, water particles as well as liquids and other substances and to prevent them from further passage. The pre-filter has a good efficiency with respect to larger particles, for example particles larger than 5 μm, but at the same time a rather bad efficiency with respect to smaller particles. Silica gel having large pores and silica gel having fine pores are arranged one after the other in a second chamber of a deposit zone. The silica gel with large pores serves to collect larger carbon compounds and other chemical compounds. It also serves to take up water in liquid form. The silica gel having fine pores serves to take up smaller carbon compounds and water in vapor form. These two kinds of silica gel are arranged in one common deposit chamber. The direction of flow of the compressed air to be cleaned is directed against gravity. Next, there is another deposit chamber in which a molecular sieve is arranged. Finally, the compressed air passes beyond a fine filter which is suitable to take up and to deposit smaller particles. The majority of deposit chambers including the separate treatment substances are located one after the other in a deposit zone in a cartridge. The cartridge is designed to be replaceably connected to a base element. Despite the arrangement of the plurality of separate treatment layers, the deposit effect for oil mist is not optimal. Such oil mist has a negative effect on the reliable functionality of valves being located in the system.

A replaceable cartridge for cleaning compressed air in compressed air supply systems of motor vehicles is known from the PCT Application published under WO 01/52973 A1. The known cartridge includes a housing in which a deposit chamber is arranged, the deposit chamber being filled with a treating substance. The treating substance substantially serves to take up humidity from the air to be cleaned. A coalescence filter is arranged at the entrance side of the deposit chamber being filled with a treating substance. The coalescence filter may include laminated fibers or a fiber mat, and it serves to take up oil vapors from the introduced air flow to protect the treating substance being located downstream from contacting such oil vapor. The coalescence filter is designed and arranged in a conical way such that the deposited oil is collected at the radial outer circumference of the coalescence filter. During regeneration of the cartridge, the coalescence filter is lifted from its seat in an upward direction such that the collected oil is removed by the regeneration air flow.

A replaceable cartridge for cleaning compressed air in compressed air supply systems of motor vehicles is known from US Patent Application No. US 2004/0016342 A1. The known cartridge includes a deposit chamber being located inside of a housing and being filled with a treating substance. The deposit chamber serves to take up humidity from the compressed air to be cleaned. A coalescence filter is arranged at the entrance side of the deposit chamber. The coalescence filter consists of fiberglass and the like and it serves to deposit oil or oil mist to keep it away from the following treating substance. At the exit side, the coalescence filter is surrounded by a sucking material which serves to transport deposited drops of oil into a collecting chamber. The coalescence filter is bypassed by a bypass conduit in which a check valve is arranged, the check valve opening during regeneration of the cartridge. The compressed air to be cleaned coming from the compressor is first introduced into the coalescence filter which causes the danger of clogging effects occurring at the coalescence filter and the coalescence filter loosing its efficiency.

An air dryer is known from the PCT Application published under WO 94/26569 corresponding to U.S. Pat. No. 5,286,283. An oil filter is located upstream of the deposit zone including the treating substance for taking up humidity. The oil filter serves to deposit oil. The collected oil is transported into the deposit chamber, and it cannot be removed before regeneration, the oil being removed through a bypass conduit connecting the deposit chamber to the entrance and bypassing the oil filter during regeneration.

An air filter is known from U.S. Pat. No. 5,002,593. The air filter includes a deposit chamber being filled with a drying agent. An oil separator and an oil filter are located upstream of the entrance of the deposit chamber.

All these known constructions of air filters and cartridges, respectively, have in common that the coalescence filter is arranged at the entrance of the air dryer and that the coalescence filter serves to remove oil from the compressed air to be cleaned coming from the compressor such that there is no negative influence on the deposit chamber for humidity being filled with a drying agent and being located downstream. Direct introduction of the flow of compressed air coming from the compressor into the coalescence filter causes comparatively great load acting upon the coalescence filter. There is the danger of the coalescence filter clogging due to drops of water, drops of oil, coke particles and similar larger cluster-like elements such that the positive effect of the coalescence filter quickly decreases. In this way, the desired protection of the deposit chamber including the drying agent and being located downstream is no longer ensured.

Another air dryer and a method for removing water from air are known from the PCT Application published under WO 99/21641.

Figure 1:
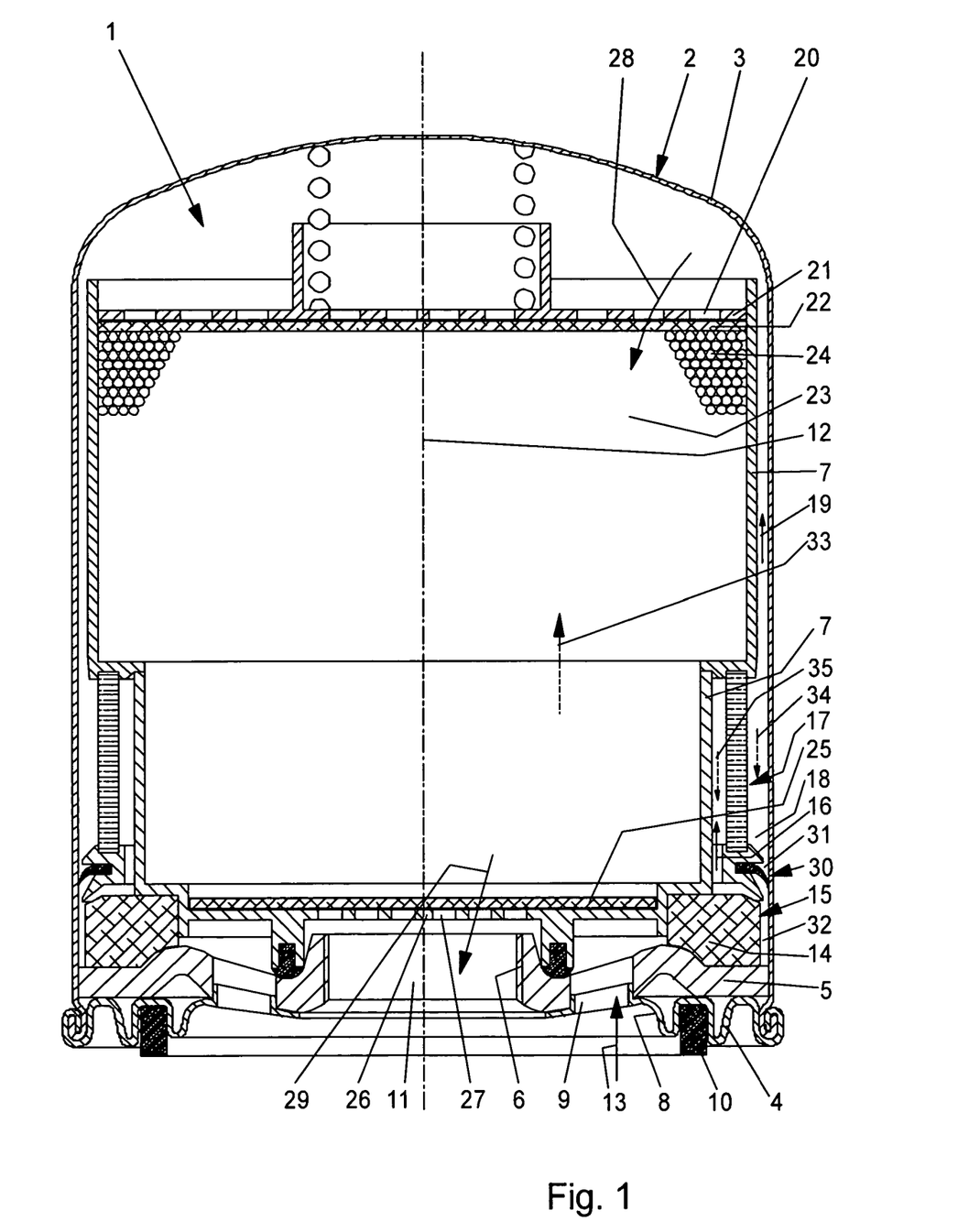
FIG. 1 is a partly sectional view of a first exemplary embodiment of the novel cartridge.

Another air dryer is known from German Patent Application No. DE 103 29 401 A1. This document includes a FIG. 3 which is prior art with respect to the invention disclosed in this document. FIG. 3 shows an air dryer in which a filter being designated as a fleece filter is located upstream of a drying insert being filled with a drying agent. This document considers the prior art air dryer according to FIG. 3 as causing problems in the sense of the fleece filter being polluted over time which results in a reduction of the filter effect and which makes it necessary to replace the filter. To overcome these drawbacks, this document teaches an air dryer as illustrated in FIG. 1. This air dryer does not include a fleece filter, but instead only a coalescence filter being arranged at the entrance side upstream of a drying insert. In this way, the compressed air including solid impurities and liquid impurities is introduced into the coalescence filter via a chamber which is located upstream of the coalescence filter. This chamber does not include any filter material. Only in the embodiment of FIG. 2 of this document, a small part of this chamber includes a fleece filter which covers the coalescence filter at one side and which only has a small thickness through which the flow is guided. A check valve is located below this packet being formed by the fleece filter and the coalescence filter. A check valve is designed and arranged such that the polluted compressed air is initially forced through the fleece filter and then through the coalescence filter. During regeneration, the compressed air bypasses the fleece filter such that impurities contained in the fleece filter are not removed from the fleece filter. Consequently, there is no forced flow though the fleece filter and thus no forced cleaning of the fleece filter during the regeneration phase.

SUMMARY OF THE INVENTION

The present invention relates to a cartridge for cleaning compressed air to be used in compressed air supply systems of motor vehicles. The cartridge includes a housing, a pre-filter, a deposit chamber, a coalescing filter, a bypass conduit and a check valve. The deposit chamber is located downstream of the pre-filter. The deposit chamber is filled with a treating substance. The coalescing filter is arranged between the pre-filter and the deposit chamber. The bypass conduit is designed and arranged to bypass the coalescing filter and not to bypass the pre-filter. The check valve is arranged in the bypass conduit in a way that it opens during regeneration of the cartridge.

The present invention also relates to a method of cleaning compressed air to be used in a compressed air supply system of a motor vehicle. The method includes the steps of: directing the compressed air containing impurities, water and oil though a pre-filter; removing larger particles of impurities and water from the compressed air in the pre-filter; directing the compressed air though a coalescing filter; collecting oil from the compressed air in the coalescing filter to form larger oil particles and removing the larger oil particles from the compressed air downstream of the coalescing filter; directing the compressed air though a deposit chamber, the deposit chamber being filled with a treating substance; removing water from the compressed air in the deposit chamber; during regeneration transferring the larger oil particles located downstream of the coalescing filter into the atmosphere by a flow of regeneration air while bypassing the coalescing filter; and during regeneration transferring the larger particles of impurities and water located in the pre-filter into the atmosphere by a flow of regeneration air directed though the pre-filter.

Generally, the load phase of an air dryer and of a cartridge being part of an air dryer, respectively, is to be understood as the phase when the compressor delivering the compressed air conveys the compressed air through the cartridge and into a reservoir container of the compressed air supply system of a motor vehicle. During passage of the compressed air through the cartridge, the compressed air including impurities is cleaned, and the removed impurities remain located in the cartridge. The regeneration phase and regeneration of the cartridge, respectively, is thus to be understood as the cleaning phase during which the impurities are removed from the cartridge. This is realized by pumping compressed air in the opposite direction of flow, meaning from the reservoir container through the cartridge and into the atmosphere. In this way, the regeneration air or cleaning air removes the impurities from the cartridge and discharges them into the atmosphere.

Motor vehicles, especially trucks and other commercial vehicles, require compressed air for controlling and actuating a variety of elements of their compressed air system. Especially, such elements are valves, brake cylinders and the like. The compressed air is delivered by a compressor which sucks in ambient air and which compresses the ambient air to reach a pressure level such that the compressed air can be distributed through various conduits to be stored in containers of a plurality of circuits of the compressed air system. In this way, a plurality of circuits is realized. The most important circuits with respect to safety aspects are the two driver's brake circuits. The compressor is alternately operated in the load phase and in the idle phase, and it delivers compressed air to a compressed air processing unit during the load phase. The compressed air will always contain some impurities, especially oil, carbonization remainders, wear particles, and the like. Additionally, the sucked in air always contains humidity which would enter the compressed air system. The impurities contained in the compressed air have a negative influence on the reliability of the elements of the compressed air system located downstream, especially valves. Especially when tight flow cross-sections at the valves and at other elements of the compressed air system are used, these elements tend to clog. Especially during wintertime, introduced humidity can condense and freeze which has a negative effect on the functionality of the elements located downstream.

However, with the novel method and the novel replaceable cartridge, it is possible to reduce continued transfer of especially fine mists through the compressed air supply system and towards the valves and other elements located therein during an increased usable lifetime of the cartridge.

According to the novel method, the compressed air to be cleaned is first guided through a pre-filter, then through a coalescence filter (also called coalescing filter herein) and afterwards through a deposit zone including a treating substance. The pre-filter serves to collect and deposit larger particles and cluster-like units, especially water drops, oil drops and coke particles. These particles to be removed are especially such ones which have a negative effect on the function of the coalescing filter and which may cause accelerated clogging of such a filter. In the novel cartridge, the pre-filter is located upstream of the coalescing filter to only introduce smaller particles (especially in the form of oil mist, water mist and the like) into the coalescing filter. The coalescing filter is capable of maintaining its functionality over a longer period of time with respect to such small particles such that the usable time period of the novel cartridge is increased. The function of the coalescing filter is also important for the deposit chamber being filled with a treating substance. In the deposit chamber, it is substantially humidity which is deposited. Due to the novel method, this third cleaning step also securely fulfills its full function.

During regeneration, the larger particles being collected and deposited downstream of the coalescing filter are introduced into the atmosphere with a regeneration air flow while at least partly bypassing the coalescing filter. The material collected by the coalescing filter which forms larger clusters of particles is not pressed through the coalescing filter in the opposite direction, but it instead bypasses the coalescing filter to prevent the coalescing filter from getting congested during regeneration. The regeneration air flow may also be used to clean the pre-filter. The pre-filter is not bypassed, but instead the air flows through it in the opposite direction such that the larger particles being collected and deposited by the pre-filter are detached from it and discharged into the atmosphere.

It makes sense to introduce the flow through the coalescing filter at a smaller velocity than through the pre-filter.

The coalescing filter being arranged in the novel cartridge is no longer arranged at the entrance side as it is known in the prior art, but instead downstream of the pre-filter. The pre-filter is designed in a way that it is capable of collecting and depositing larger particles such that the coalescing filter being located downstream thereof is only subjected to smaller particles. In this way, it is possible to design the coalescing filter as desired for the respective load such that the danger of clogging effects is substantially reduced and the functionality is maintained during long periods of time. This is especially the case since the collected and agglomerated particles do not flow through the coalescing filter during regeneration.

To improve the effect of the coalescing filter, the coalescing filter may be substantially arranged at a vertical orientation in the housing. The coalescing filter at its exit side includes a collecting chamber for larger particles to be deposited. The collecting chamber is connected to the bypass conduit through which the regeneration air flows during regeneration, while there is no flow in the bypass conduit during the load phase.

The coalescing filter may be arranged in an insert. Such an arrangement simplifies introduction and assembly of the replaceable cartridge with its single components.

In addition to the first check valve, a second check valve may be arranged in the region of the coalescing filter and of the bypass conduit, respectively. The second check valve is arranged to open in the opposite direction, and it prevents a partial flow of air through the coalescing filter during regeneration.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE INVENTION

Referring now in greater detail to the drawings, FIG. 1 illustrates a novel cartridge 1. The cartridge 1 is designed as a replaceable unit to be assembled with a base unit to form an air dryer of a compressed air supply system of a motor vehicle (not illustrated). The cartridge 1 includes a housing 2 including a plurality of interconnected elements. The housing 2 includes an outer housing including a plurality of sheet elements 3, 4 which are interconnected by rolling. A cover 5 having a threaded connection 6 is located in the outer housing. An inner wall 7 having a stepped design is located in the housing 2. A face wall 8 including an opening 9 is located next to the cover 5 in a lower region. The face wall 8 includes a seal 10 which contacts the base element (not illustrated) when connecting the cartridge 1 to the base element by the threaded connection 6. The openings 9 located in the cover 5 are arranged to be distributed about the circumference. The threaded connection 6 includes an opening 11. The cartridge 1 substantially is designed to be rotationally symmetrical with respect to a center axis 12.

Compressed air to be cleaned is delivered by a compressor (not illustrated) in the direction of arrow 13 and through the openings 9 located in the sheet element 4 and through the cover 5. At first, the compressed air flows through a first deposit chamber 14 in which a preliminary filter or pre-filter 15 is arranged. The pre pre-filter 15 may be designed as a fibrous filter. The pre-filter 15 has an annular shape. The pre-filter 15 serves for deposit of comparatively great particles of carbon, oil, drops of water and the like. The compressed air then flows in the direction of arrow 16 towards a coalescing filter 17 having an annular shape and substantially being arranged to be vertical. The inner wall 7 of the cartridge 1 has the illustrated stepped design to support the coalescing filter 17. The coalescing filter 17 is designed and arranged to combine smaller particles to form greater units of particles which may then be deposited in a collecting chamber 18. In the illustrated embodiment, the collecting chamber 18 is located at the outside of the coalescing filter 17 and between the coalescing filter 17 and the sheet element 3. The combined smaller particles reach the collecting chamber 18 under the influence of gravity. The compressed air then flows through a comparatively small annular gap located between the sheet element 3 and the inner wall 7 in an upward direction according to arrow 19. The direction of flow is then inverted, and the compressed air flows through openings 20 located in a cover part 21 and through a fine filter mat into a deposit chamber 23 which is filled with the illustrated treatment substance 24. For example, the treatment substance 24 may be silica gel. The silica gel may have large pores and/or fine pores, and it fills the entire deposit chamber 23 to reach a lower filter mat 25. For reasons of clarity of the drawings, only some particles of the treatment substance 24 are illustrated. The deposit chamber 23 and the deposit zone formed thereby, respectively, has a lower end being designed as a face wall 26 having openings 27. The openings 27 are connected to the opening 11 which is surrounded by the threaded connection 6. In this way, compressed air flows through the deposit chamber 23 in the direction of arrows 28 and 29.

A check valve 30 is associated with the coalescing filter 17. The check valve 30 is located in a bypass conduit 31. The bypass conduit 31 bypasses the coalescing filter 17 in an outer direction, and it connects the collecting chamber 18 with an intermediate chamber 32 which is located at the exit side with respect to the pre-filter 15. The check valve 30 may be designed as a collar-shaped element. The check valve 30 serves to guide the compressed air which has passed through the pre-filter 15 during the load phase in a definite way according to arrow 16 to allow for deposit of combined fine deposited particles in the collecting chamber 18.

During regeneration of the cartridge 1, compressed air flows through the openings 11 in the other direction and through the deposit chamber 23 against gravity, meaning in an upward direction. This flow is illustrated by the broken line of arrow 33. This flow then also flows against the direction of arrow 19 into the annular gap between the sheet element 3 and the inner wall 7 in an upward direction, and it splits up at the coalescing filter 17. A part of the regeneration air flow flows in a downward direction at the outside of the coalescing filter 17 according to arrow 34 and through the collecting chamber 18 to transport the particles which are deposited at this place into the intermediate chamber 32 via the opening check valve 33. Another part of the regeneration air flow passes through the coalescing filter 17 in the inverted direction and then in a downward direction at the inner side of the coalescing filter 17 according to arrow 35 until this part of the flow unites with the other part in the intermediate chamber 32. The united regeneration air flow then presses the particles deposited on the coalescing filter 17 in a backward direction through the pre-filter 15 and through the openings 9 into the atmosphere. This flow occurs in the inverted direction of arrow 13.

The coalescing filter 17 has a greater height than the pre-filter 15. The velocity at which the compressed air flows through the coalescing filter 17 is lower than the velocity at which the compressed air flows through the pre-filter 15. This applies during the load phase as well as during the regeneration phase.

Figure 2:
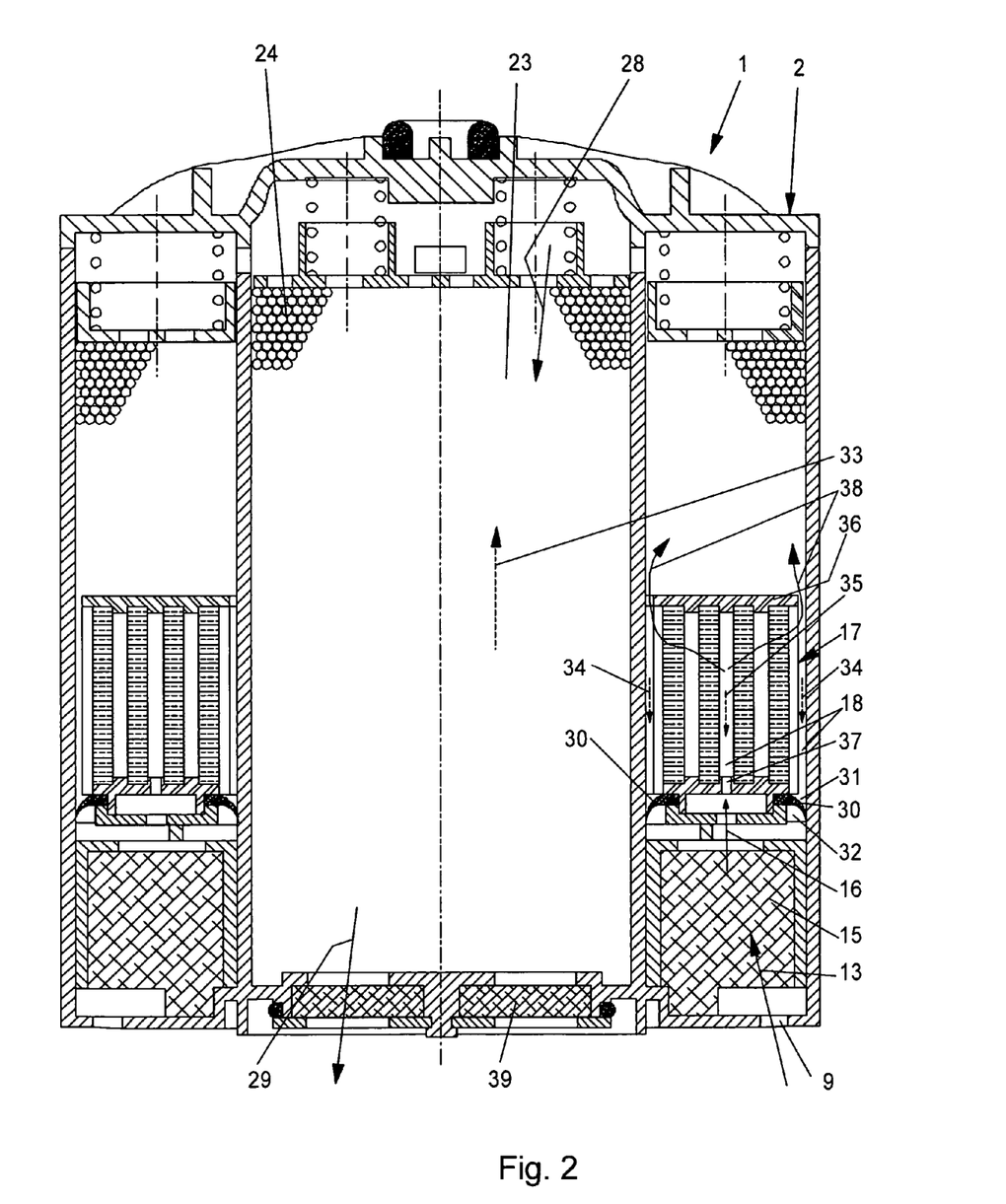
FIG. 2 is a sectional view of a second exemplary embodiment of the novel cartridge.
Figure 3:
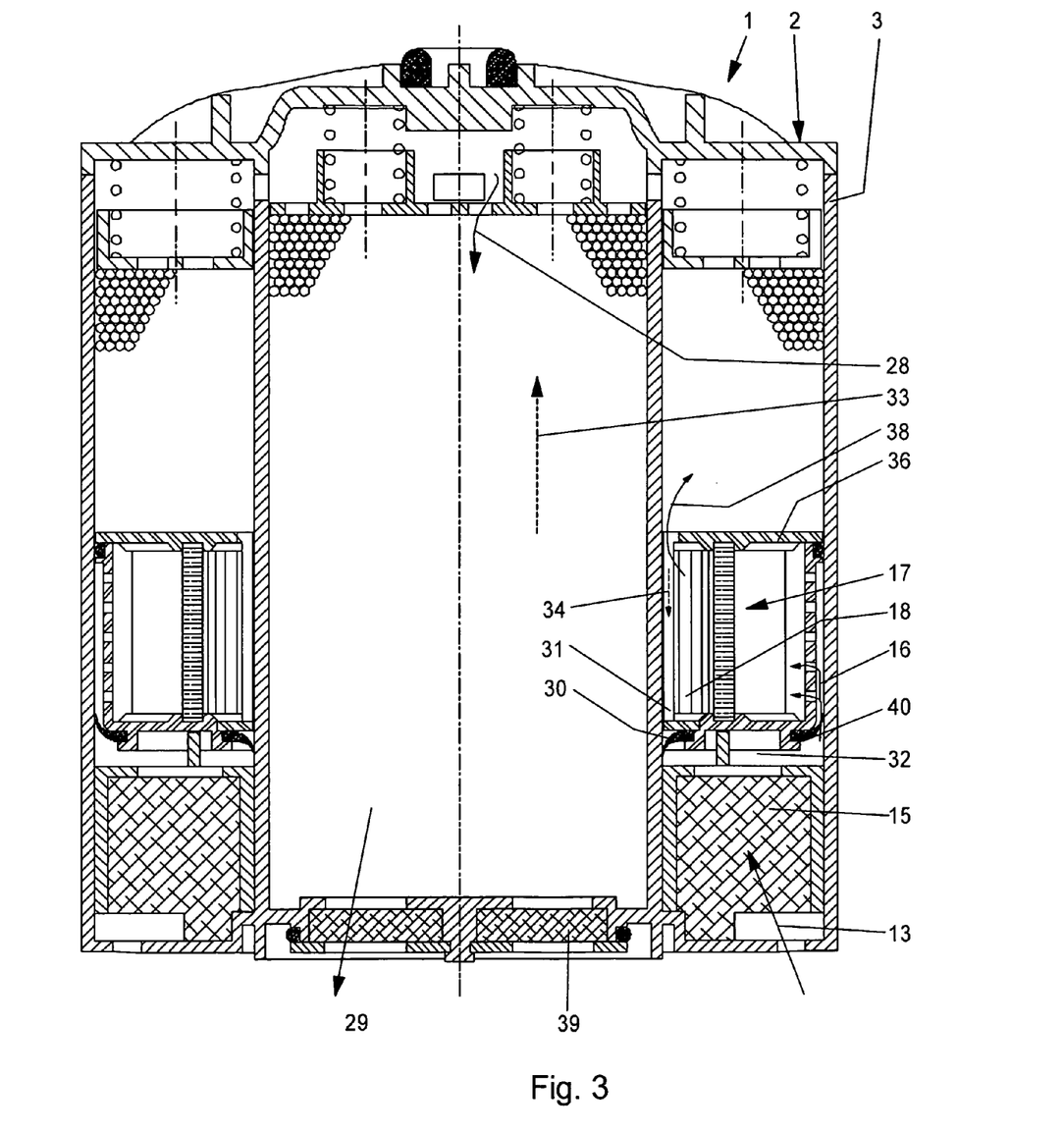
FIG. 3 is a sectional view of a third exemplary embodiment of the novel cartridge.

FIG. 2 illustrates a second exemplary embodiment of the novel cartridge 1. The housing 2 includes a plurality of parts which are interconnected in the illustrated way. A pre-filter 15 is arranged in the lower portion. Compressed air flows through openings 9 located in the pre-filter 15 according to arrow 13. The coalescing filter 17 being arranged downstream of the pre-filter 15 is arranged in an insert 36. The insert 36 is designed as an annular body in which the coalescing filter 17 including four annular elements is located. During the load phase, compressed air flows according to arrow 16 through the pre-filter 15 and through an opening 37 into the interior of the coalescing filter 17. A part of the flow is directed in a radial inward direction, and it flows through two rings of the coalescing filter 17. In this way, one collecting chamber 18 is formed at the outside and one is formed at the inside. Accordingly, there are two bypass conduits 31 and two check valves 30. Compressed air flows through the rings of the coalescing filter 17 during the load phase according to arrows 38. Compressed air flows through the deposit chamber 23 for removal of humidity, the deposit chamber 23 being filled with a treating substance 24, according to arrows 28 and 29. A fine filter 39 is arranged at the lower end of the deposit chamber 23.

During the regeneration phase, the regeneration air flows in an inverted direction, meaning according to arrow 33 in an upward direction through the deposit chamber 23 such that humidity or moisture which has deposited at this place is removed. The flow once again is divided at the insert 36 of the coalescing filter 17. A part of the flow is directed through the bypass conduit 31 at the outside and at the inside according to arrows 34. The particles being deposited in the collecting chambers 18 are not transported through the depositing rings of the coalescing filter 17, but instead directly through the opening check valves 30 into the intermediate chamber 32 such that they can be discharged into the atmosphere via the pre-filter 15. Another part of the regeneration air flow flows through the coalescing filter 17 in a rear direction at a comparatively low velocity, and it also reaches the intermediate chamber 32 via the openings 37 according to arrow 35.

FIG. 3 illustrates a third exemplary embodiment of the novel cartridge 1. This embodiment of the cartridge 1 has many features in common with the embodiment of FIG. 2. However, the insert 36 of the coalescing filter 17 has a slightly different design. In addition to the check valve 30, the insert 36 supports another check valve 40 which opens in the opposite direction of flow compared to the check valve 30. In this way, one attains a clear outer flow towards the coalescing filter 17 during the load phase. The air flows from the outside towards the inside through the deposit ring of the coalescing filter 17. The deposit ring has a star-shaped design to increase the surface. Thus, the collecting chamber 18 is formed within the deposit ring of the coalescing filter 17. The additional check valve 40 prevents air from flowing through the coalescing filter 17 during the regeneration phase. The entire amount of regeneration air is kept away from the coalescing filter 17, and it exclusively flows through the bypass conduit 31 connecting the collecting chamber 18 with the intermediate chamber 32 via the opening check valve 30.

Figure 4:
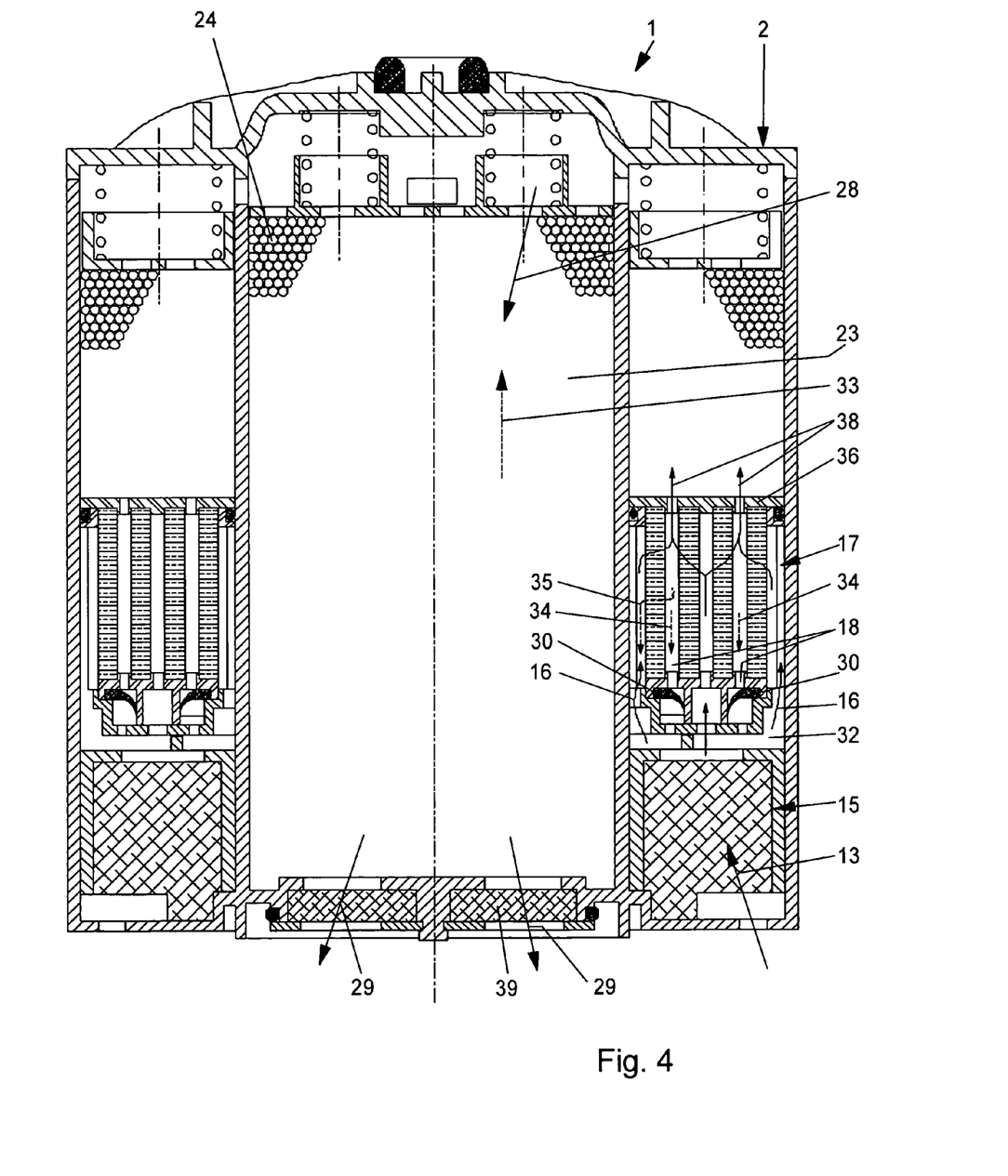
FIG. 4 is a sectional view of a fourth exemplary embodiment of the novel cartridge.

The exemplary embodiment of the cartridge 1 according to FIG. 4 has many features in common with the above described embodiments. Four filter rings are located in a parallel arrangement at the coalescing filter 17. Once again, the filter rings are arranged to be aligned in a vertical direction in the insert 36. The insert 36 includes the illustrated openings and two check valves 30. Each one of the check valves 30 is associated with a collecting chamber 18.

During the load phase, the compressed air to be cleaned flows through the pre-filter 15 according to arrow 13. The flow is divided upstream of the coalescing filter 17 in the intermediate chamber 32 into four distinct flow paths which are reunified downstream of the coalescing filter 17 according to arrows 38.

During regeneration, the compressed air flows in the opposite direction. It flows through the deposit chamber 23 according to arrow 33. The flow is divided in the coalescing filter 17, the particles being deposited in the two deposit chambers 18 being removed from a part of the regeneration air flow according to arrow 34 into the intermediate chamber 32, while another part flows through the respective ring of the coalescing filter 17 according to arrow 35.

Figure 5:
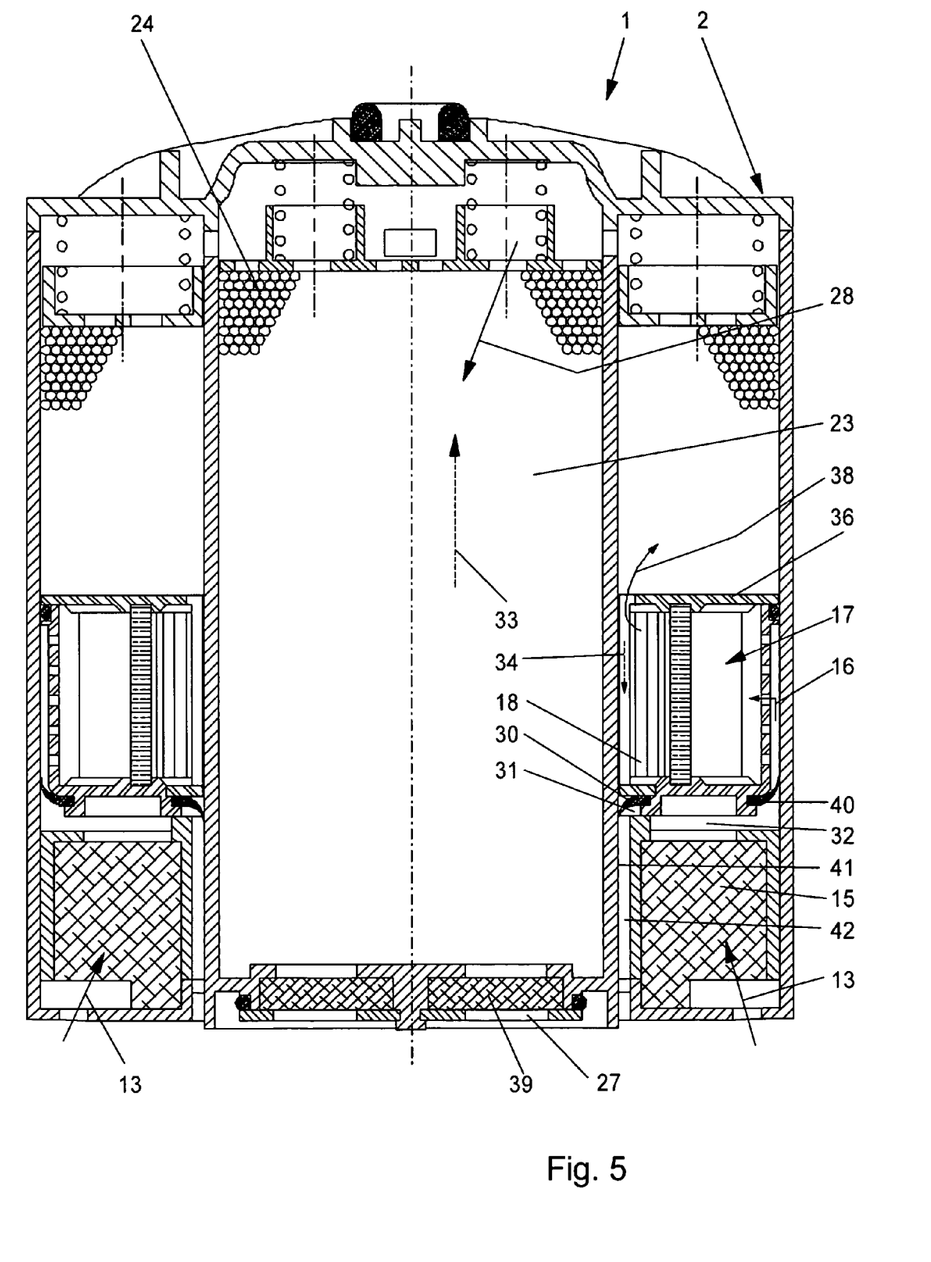
FIG. 5 is a sectional view of a fifth exemplary embodiment of the novel cartridge.

The exemplary embodiment of the novel cartridge 1 according to FIG. 5 has many features in common with the embodiment illustrated in FIG. 3. The insert 36 carries the two check valves 30 and 40. The lower part of the inner wall 7 forms a separating wall 41. The inner diameter of the housing of the pre-filter 15 is designed to be comparatively greater such that there is a gap 42 at this place. In this way, the bypass conduit 31 bypasses the coalescing filter 17 as well as the pre-filter 15. The check valve 30 is arranged in this bypass conduit 31. Removal of the particles collected in the collecting chamber 18 is realized while bypassing the coalescing filter 17 and the pre-filter 15, the particles being discharged into the atmosphere.

Many variations and modifications may be made to the preferred embodiments of the invention without departing substantially from the spirit and principles of the invention. All such modifications and variations are intended to be included herein within the scope of the present invention, as defined by the following claims.

What is claimed is:

1. A cartridge for cleaning compressed air to be used in compressed air supply systems of motor vehicles, comprising:
    a housing;
    a pre-filter, said pre-filter being arranged in said housing;
    a deposit chamber, said deposit chamber being located downstream of said pre-filter, said deposit chamber being filled with a treating substance;

a coalescing filter, said coalescing filter being arranged downstream of said pre-filter and upstream of said deposit chamber during a load phase of said cartridge;

a bypass conduit, said bypass conduit being designed and arranged to bypass said coalescing filter and not to bypass said pre-filter; and a check valve, said check valve being arranged in said bypass conduit in a way that it opens during regeneration of said cartridge.

2. The cartridge of claim 1, wherein said coalescing filter is arranged in said housing at a substantially vertical orientation, said coalescing filter has an exit side, a collecting chamber being located at the exit side and being designed and arranged to collect deposited particles of a comparatively large size, said collecting chamber being connected to said bypass conduit.

3. The cartridge of claim 1, further comprising an insert, said coalescing filter being arranged in said insert.

4. The cartridge of claim 2, further comprising an insert, said coalescing filter being arranged in said insert.

5. The cartridge of claim 1, further comprising a second check valve, said second check valve being arranged in the region of said coalescing filter and being designed and arranged to prevent a partial flow of compressed air from flowing through said coalescing filter during regeneration of said cartridge.

6. The cartridge of claim 2, further comprising a second check valve, said second check valve being arranged in the region of said coalescing filter and being designed and arranged to prevent a partial flow of compressed air from flowing through said coalescing filter during regeneration of said cartridge.

7. The cartridge of claim 3, further comprising a second check valve, said second check valve being arranged in the region of said coalescing filter and being designed and arranged to prevent a partial flow of compressed air from flowing through said coalescing filter during regeneration of said cartridge.

8. The cartridge of claim 4, further comprising a second check valve, said second check valve being arranged in the region of said coalescing filter and being designed and arranged to prevent a partial flow of compressed air from flowing through said coalescing filter during regeneration of said cartridge.

9. The cartridge of claim 1, wherein said housing includes a threaded connection and a seal being designed and arranged to be connected to other components to form an air dryer in a way to be replaceable.

10. The cartridge of claim 2, wherein said housing includes a threaded connection and a seal being designed and arranged to be connected to other components to form an air dryer in a way to be replaceable.

11. The cartridge of claim 5, wherein said housing includes a threaded connection and a seal being designed and arranged to be connected to other components to form an air dryer in a way to be replaceable.

12. The cartridge of claim 6, wherein said housing includes a threaded connection and a seal being designed and arranged to be connected to other components to form an air dryer in a way to be replaceable.

13. A method of cleaning compressed air to be used in a compressed air supply system of a motor vehicle, said method comprising the steps of:

directing the compressed air containing impurities, water and oil though a pre-filter in a load phase;

removing larger particles of impurities and water from the compressed air in the pre-filter;

directing the compressed air though a coalescing filter, after directing the compressed air through the pre-filter during the load phase;

collecting oil from the compressed air in the coalescing filter to form larger oil particles and removing the larger oil particles from the compressed air downstream of the coalescing filter;

directing the compressed air though a deposit chamber after directing the compressed air through the coalescing filter during the load phase, the deposit chamber being filled with a treating substance;

removing water from the compressed air in the deposit chamber; and during a regeneration phase transferring the larger oil particles located downstream of the coalescing filter into the atmosphere by a flow of regeneration air while bypassing the coalescing filter and not bypassing the pre-filter; and during the regeneration phase transferring the larger particles of impurities and water located in the pre-filter into the atmosphere by a flow of regeneration air directed though the pre-filter.

14. The method of claim 13, wherein the larger oil particles located downstream of the coalescing filter are transferred into the atmosphere by the flow of regeneration air flowing through the pre-filter.

15. The method of claim 13, wherein the regeneration air flows through the coalescing filter at a lower velocity than through the pre-filter.

16. The method of claim 14, wherein the regeneration air flows through the coalescing filter at a lower velocity than through the pre-filter.

17. The method of claim 13, wherein the regeneration air is directed though a check valve being arranged parallel to the coalescing filter.

18. The method of claim 14, wherein the regeneration air is directed though a check valve being arranged parallel to the coalescing filter.

19. The method of claim 15, wherein the regeneration air is directed though a check valve being arranged parallel to the coalescing filter.

20. The method of claim 16, wherein the regeneration air is directed though a check valve being arranged parallel to the coalescing filter.

* * * * *